United States Patent [19]

Carey, Jr. et al.

[11] Patent Number: 4,584,651
[45] Date of Patent: Apr. 22, 1986

[54] PROCESS CONTROLLER WITH POWER OUTAGE ANALYSIS CAPABILITY

[75] Inventors: John L. Carey, Jr., Warrington; Jack Elias, Lansdale, both of Pa.

[73] Assignee: Honeywell Inc., Minneapolis, Minn.

[21] Appl. No.: 528,311

[22] Filed: Aug. 31, 1983

[51] Int. Cl.⁴ .............................................. G04F 10/00
[52] U.S. Cl. .................................... 364/483; 364/569; 377/16
[58] Field of Search ............... 364/483, 569, 143, 145, 364/184, 492, 493; 377/16, 20; 307/200 A, 200 B; 368/121

[56] References Cited

U.S. PATENT DOCUMENTS

| | | | |
|---|---|---|---|
| 4,166,975 | 9/1979 | Germer et al. | 364/483 X |
| 4,180,724 | 12/1979 | Councilman et al. | 377/16 |
| 4,293,915 | 10/1981 | Carpenter et al. | 364/145 X |
| 4,466,074 | 8/1984 | Jindrick et al. | 364/569 |

Primary Examiner—Edward J. Wise
Attorney, Agent, or Firm—Mitchell J. Halista; Trevor B. Joike

[57] ABSTRACT

A process controller with power outage analysis capability uses a real time clock generator powered by an uninterruptible power source for providing a real time reference which is used to measure the actual duration of a process controller disabling power outage. A non-volatile memory is also powered by the uninterruptible power source and is used to store the maximum allowable outage time limit for a particular process being controlled. The clock generator is initialized at the start of the power outage by a power outage detector which provides an early warning of an imminent power outage. After the power is restored to the controller, a digital computer used in the process controller compares the actual power outage time as represented by the accumulated clock time with allowable power outage time limit stored in the memory and is arranged to provide a first process control sequence if the actual power outage time is less than the maximum allowable time and a second process control sequence if the actual power outage time is greater than the maximum allowable time.

10 Claims, 2 Drawing Figures

PROCESS CONTROLLER WITH POWER OUTAGE ANALYSIS CAPABILITY

BACKGROUND OF THE INVENTION

1. Field of the Invention

The present invention is directed to process controllers. More specifically, the present invention is directed to a process controller for controlling a process in response to the duration of a controller disabling power outage.

SUMMARY OF THE INVENTION

The object of the present invention is to provide a process controller having power outage analysis capabilities.

In accomplishing this and other objects, there has been provided, in accordance with the present invention, a process controller having a real time clock means for accumulating a real time duration, a non-volatile memory means for storing a real time duration limit, an uninterruptible power source for powering the clock, power outage detector means for initializing the clock means in response to the detection of an imminent power outage of power to the controller and a comparison means for comparing after the restoration of power following a power outage the time accumulated in the clock means with the stored time duration limit to produce a first process control sequence if the accumulated time is less than the stored limit and a second process control sequence if the accumulated time is greater than the stored limit.

BRIEF DESCRIPTION OF THE DRAWING

A better understanding of the present invention may be had when the following detailed description is read in connection with the accompanying drawings, in which.

DESCRIPTION OF PREFERRED EMBODIMENT

Figure 1:
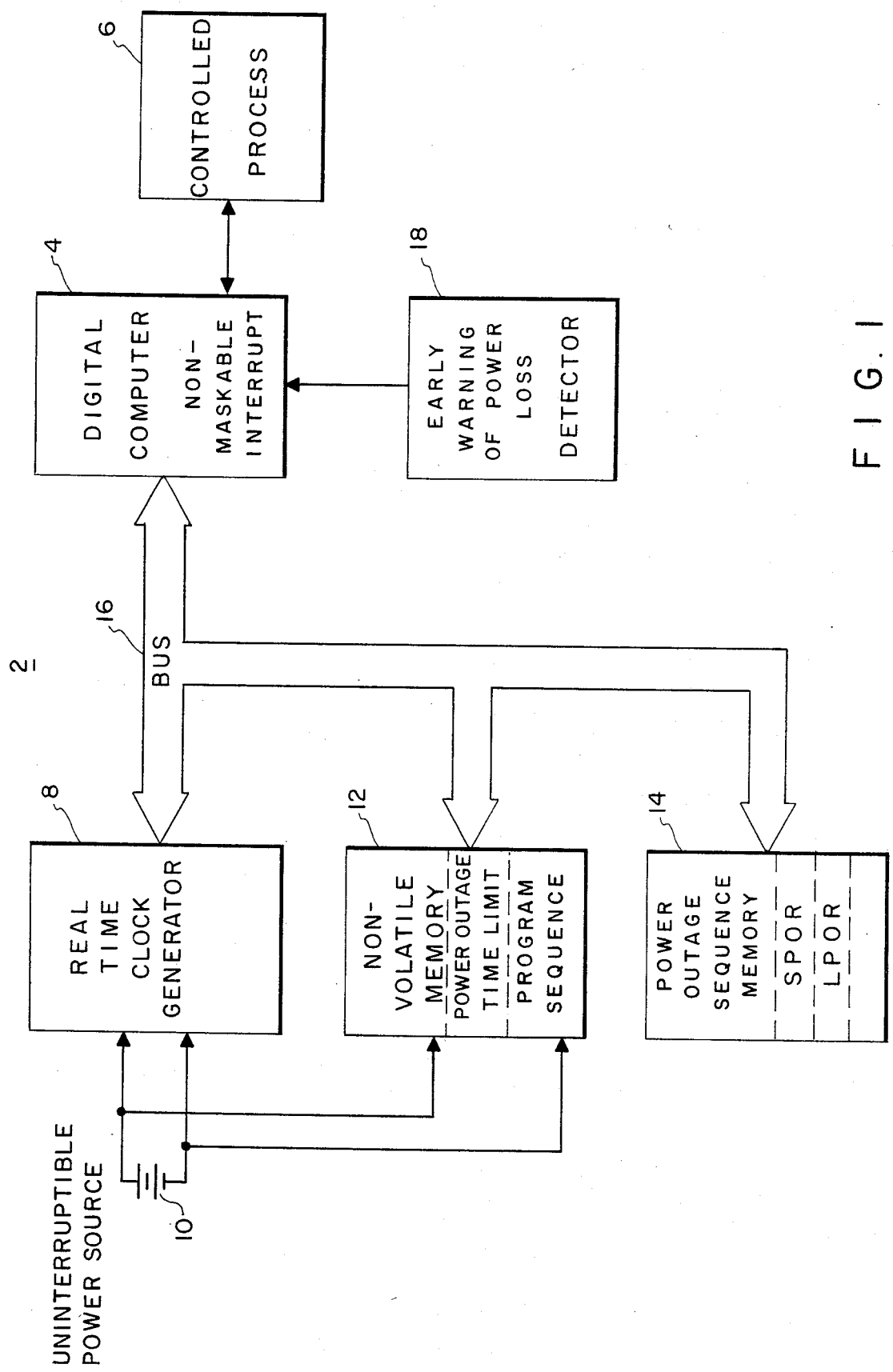
FIG. 1 is a block diagram of a process controller embodying an example of the present invention and FIG. 2 is a flow chart of the operation of the process controller shown in FIG. 1.
Figure 2:
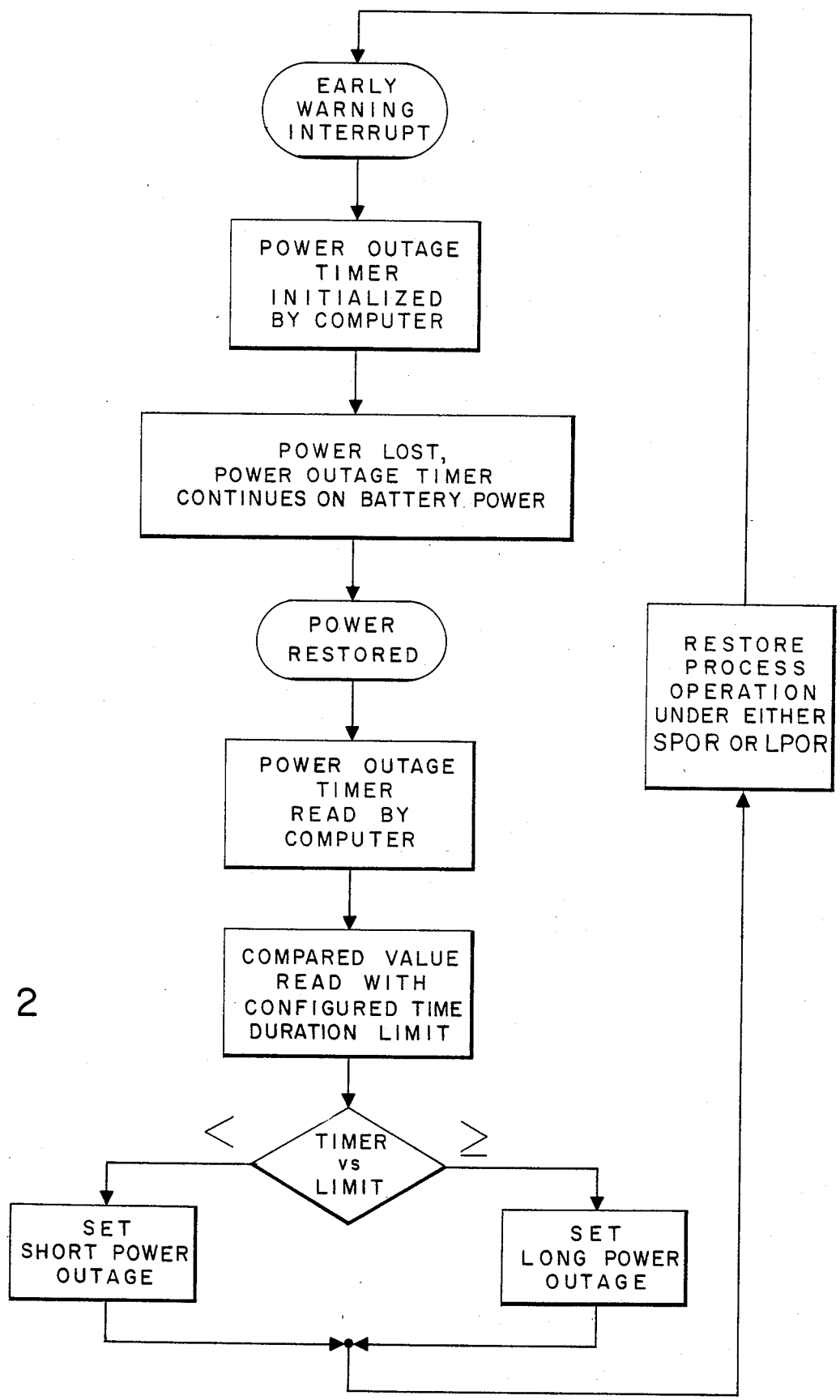

Referring to FIG. 1 in more detail, there is shown a process controller 2 embodying an example of the present invention and utilizing a digital computer 4 for controlling a process 6 according to a predetermined stored program. The controlled process 6 may be an industrial process, an oven, a distillation plant, etc. A real time clock generator 8 is arranged to be powered by an uninterruptible power source such as a battery 10 which is unaffected by a power outage to the controller 2. The real time clock generator 8 is arranged to provide an output indicative of accumulated actual time. A non-volatile memory 12 which may be in the form of a EPROM (electrically programmable read-only-memory) or a RAM (random access memory), such devices being well-known in the art, is used to store a power outage time limit for the particular process 6 being controlled and a program for operating the digital computer 4. The non-volatile memory 12 is also arranged to be energized from the power source 10. A power outage sequence memory 14 in the form of a random-access-memory (RAM) is used to store the power outage decision program for operating the digital computer 4 and the process 6 after a power restoration. Specifically, the power outage sequence memory 14 stores digital words or "flags" representing short power outage recovery (SPOR) and long power outage recovery (LPOR) in corresponding RAM locations. A data bus 16 is arranged to interconnect the clock generator 8, the non-volatile memory 12 and the program sequence memory 14 with the digital computer 2. The operation of a digital computer according to a stored program, the storing of a program suitable for operating a digital computer in a digital memory, and the storing of data in a digital memory are well-known functions currently used in the digital computer art, and a further discussion thereof is believed to be unnecessary for a complete understanding of the present invention.

An early warning of power loss detector 18 is arranged to signal the imminent loss of controller power through a non-maskable interrupt to the digital computer 2. Such power loss detectors are well-known in the art, e.g., a detector monitoring a voltage level of the power being supplied to the digital computer and issuing an output signal upon a detection of a drop in the power supply voltage level. This loss of power would, of course, affect the operation of the process controller 2. Typical process controllers can ride through power outages of only 1 or 2 cycles of the alternating current power line as a result of charge storage in power supply capacitors. However, many of the processes being controlled by the controller 2 can have thermal time constants ranging from seconds to minutes. Consequently, the ability of the controlled process 6 to ride through a power outage is initially limited by the controller system and not by the process itself. Of course, a long power outage would eventually enter the area of a disturbance to the operation of the controlled process 6. While some prior art process controllers have used non-volatile memories to store the last state of the controlled process 6 during power outages, such prior art controllers could not distinguish between a process disturbing power outage and a non-disturbing power outage. Consequently, such controllers would resume operation after the termination of a power outage even if the outage was of a sufficient duration to seriously disturb the process being controlled.

The process controller system of the present invention, on the other hand, has the capability to analyze the duration of the power outage and to vary its response following the termination of the outage depending on the duration of the outage. Thus, for short power outages that have not disturbed the process 6, the controller 2 can simply resume operation after the restoration of the power and ignore the power outage. However, for longer power outages that would probably have caused a disturbance to the process 6, the controller 2 can initiate a preprogrammed recovery response after the restoration of the power such as halting the process sequence and/or signaling the operator. The selection of the power outage response is accomplished by a comparison of the accumulated actual power outage time at the point of power restoration with a stored power outage time limit. The power outage timer includes a real time clock generator 8 and an uninterruptible power source 10 which continues to power the real time clock generator during the power outage. The power source 10 is also used to power the memory 12 during the power outage to maintain the storage of the power outage time limit. The real time clock generator 8 may also include a quartz crystal (not shown) to provide accuracy and stability in a manner well-known in the art.

Initially, the early warning detector 18 is used to signal the digital computer 4 through the non-maskable interrupt of the imminent loss of controller power. The digital computer 4, in turn, initializes the real time clock generator 8 to start an accumulation of the time, i.e., the duration of the power outage. After the controller power is restored, the time clock generator 8 is interrogated by the computer 4, and the accumulated time is read out. The power outage duration that has been defined by the user of the system as the maximum limit for a short power outage for the particular process being controller 6 is stored in the memory 12 which is also interrogated by the digital computer 4 after the restoration of the power. The computer 4 compares the actual power outage duration with the time limit stored in the memory 12. If the actual power outage was shorter in duration than the stored time limit, the computer 4 stores an SPOR "flag" in the memory 14 in a short power outage recovery (SPOR) location. If the power outage duration was longer than the time limit stored in the memory 12, the computer 4 stores an LPOR "flag" in the memory 14 in a long power outage recovery (LPOR) location.

The short and long power outage recovery program sequences are stored in separate locations in the memory 12 and are used to control the subsequent operation of the digital computer 4 to provide an appropriate response by the process controller 2 for the controlled process 6. Specifically, the digital computer 4 would then proceed under control of the program stored in the memory 12 to restart the process 6. One of the steps in this restart operation is to interrogate the power outage sequence memory 16 to determine which "flag" had been stored therein as a result of the aforesaid comparison. The "flag" which is detected by the computer 4 is determinative of the further operation of the computer 4 in restarting the process 6, i.e., an SPOR "flag" produces a first restart sequence and an LPOR "flag" produces a second restart sequence. Accordingly, the use of a power outage analysis produces a restart sequence which is correlated to the controlled process 6. Thus, in the event of a short power outage the process 6 can be simply restarted to continue its operation while in the case of a long power outage an improper restart of the controlled process 6 is prevented. The long power outage recovery sequence can also be used to reset non-volatile elements such as retention relays, timers, counters, etc. as well as providing a warning indication or display.

Accordingly, it may be seen, that there has been provided, in accordance with the present invention an improved process controller having power outage analysis capabilities.

The embodiments of the invention in which an exclusive property or privilege is claimed are defined as follows:

1. A process controller comprising:

a real time clock means for accumulating a real time duration, a non-volatile memory means for storing a real time duration limit, an uninterruptible power source for powering said clock, imminent power outage detector means for initializing said clock means in response to the detection of an imminent power outage of electrical power to the controller and a comparison means for comparing after the restoration of power following a power outage the time accumulated by said clock means with the time duration limit stored in said memory to produce a first process control sequence if the accumulated time is less than the time limit and a second process control sequence if the accumulated time is greater than the time limit.

2. A process controller as set forth in claim 1 wherein said comparison means includes a digital computer and said first control sequence is a first preprogrammed sequence of said digital computer and said second control sequence is second preprogrammed sequence of said digital computer.

3. A process controller as set forth in claim 2 wherein said digital computer includes a second memory means for storing a result of said comparing by said comparison means to indicate either a short power outage when the accumulated time is less than the time limit and a long power outage when the accumulated time is greater than the time limit.

4. A process controller as set forth in claim 2 wherein said non-volatile memory means is arranged to store said first and second control sequences.

5. A process controller as set forth in claim 4 wherein said uninterruptable power source is arranged to power said memory means.

6. A process controller as set forth in claim 1 wherein said non-volatile memory means includes an uninterruptible power source for continuously powering said memory means.

7. A process controller as set forth in claim 1 wherein said non-volatile memory means is arranged to store said first and second control sequences.

8. A process controller as set forth in claim 1 wherein said comparison means includes a digital computer and said detector means includes a means for producing a non-maskable interrupt for said computer to produce a preprogrammed operation of said computer to initialize said clock means upon the detection of the imminent power outage.

9. A process controller as set forth in claim 1 wherein said stored time limit is equal to a stable time of a process controlled by the process controller following a power outage.

10. A process controller as set forth in claim 1 wherein said uninterruptable power source is arranged to continually power said memory means.

* * * * *